United States Patent
Pallapolu et al.

(10) Patent No.: US 11,249,883 B2
(45) Date of Patent: Feb. 15, 2022

(54) ERROR REPAIR TOOL USING SENTIMENT ANALYSIS

(71) Applicant: Bank of America Corporation, Charlotte, NC (US)

(72) Inventors: Kalyan Chakravarthy Pallapolu, Hyderabad (IN); Srinath Nelakuditi, Manikonda (IN); Balamurali Lakshminarayanan, Chennai (IN)

(73) Assignee: Bank of America Corporation, Charlotte, NC (US)

( * ) Notice: Subject to any disclaimer, the term of this patent is extended or adjusted under 35 U.S.C. 154(b) by 275 days.

(21) Appl. No.: 16/733,036

(22) Filed: Jan. 2, 2020

(65) Prior Publication Data

US 2021/0209005 A1 Jul. 8, 2021

(51) Int. Cl.
*G10L 15/22* (2006.01)
*G06F 11/36* (2006.01)
*G06K 9/00* (2006.01)
*G10L 15/26* (2006.01)

(52) U.S. Cl.
CPC ...... *G06F 11/3664* (2013.01); *G06K 9/00268* (2013.01); *G06K 9/00288* (2013.01); *G06K 9/00744* (2013.01); *G10L 15/22* (2013.01); *G10L 15/26* (2013.01)

(58) Field of Classification Search
CPC .................................................. G10L 15/22
See application file for complete search history.

(56) References Cited

U.S. PATENT DOCUMENTS

| | | | |
|---|---|---|---|
| 5,675,803 | A | 10/1997 | Preisler et al. |
| 5,740,357 | A | 4/1998 | Gardiner et al. |
| 5,768,353 | A | 6/1998 | Browne |
| 5,966,541 | A | 10/1999 | Agarwal |
| 6,012,152 | A | 1/2000 | Douik et al. |
| 6,092,189 | A | 7/2000 | Fisher et al. |
| 6,314,532 | B1 | 11/2001 | Daudelin et al. |
| 6,381,694 | B1 | 4/2002 | Yen |
| 6,385,707 | B1 | 5/2002 | Maffezzoni |
| 6,601,186 | B1 | 7/2003 | Fox et al. |
| 6,671,699 | B1 | 12/2003 | Black et al. |
| 6,694,450 | B1 | 2/2004 | Kidder et al. |
| 6,708,291 | B1 | 3/2004 | Kidder |
| 6,757,837 | B1 | 6/2004 | Platt et al. |
| 6,983,362 | B1 | 1/2006 | Kidder et al. |
| 7,020,598 | B1 | 3/2006 | Jacobson |
| 7,047,448 | B2 | 5/2006 | Rao et al. |

(Continued)

*Primary Examiner* — Jae U Jeon

(57) ABSTRACT

An apparatus includes a memory and a hardware processor. The memory stores a plurality of previous software errors and a plurality of solutions to the plurality of previous software errors. The processor receives a video of a user describing an error in a software application and tracks a facial feature of the user to determine an emotional intensity. The processor converts an audio portion of the video to a text file and analyzes the text file to determine the error. In response to the emotional intensity exceeding a threshold, the processor determines, based on the plurality of previous software errors, a series of steps that, when performed, replicate the error, determines, based on the series of steps and the plurality of solutions, a change to the source code of the application that fixes the error, and implements the change to the software code.

20 Claims, 5 Drawing Sheets

(56) References Cited

U.S. PATENT DOCUMENTS

| | | |
|---|---|---|
| 7,062,642 B1 | 6/2006 | Langrind et al. |
| 7,100,085 B2 | 8/2006 | Miller |
| 7,120,559 B1 | 10/2006 | Williams et al. |
| 7,146,542 B2 | 12/2006 | Srinivasan et al. |
| 7,162,661 B2 | 1/2007 | Mudge et al. |
| 7,203,881 B1 | 4/2007 | Williams et al. |
| 7,225,240 B1 | 5/2007 | Fox et al. |
| 7,373,552 B2 | 5/2008 | Bjorsne |
| 7,379,846 B1 | 5/2008 | Williams et al. |
| 7,596,778 B2 | 9/2009 | Kolawa et al. |
| 7,730,363 B2 | 6/2010 | Takezawa et al. |
| 8,185,786 B2 | 5/2012 | Flautner et al. |
| 8,250,563 B2 | 8/2012 | Chefalas et al. |
| 8,543,862 B2 | 9/2013 | Dilman et al. |
| 9,201,646 B2 | 12/2015 | Balachandran |
| 9,612,937 B2 | 4/2017 | Smith et al. |
| 9,727,736 B1 | 8/2017 | McClintock et al. |
| 9,766,860 B2 | 9/2017 | Bitner et al. |
| 10,120,747 B2 | 11/2018 | Cunico et al. |
| 10,216,565 B2 | 2/2019 | Cunico et al. |
| 10,248,387 B2 | 4/2019 | Bharthulwar |
| 11,176,484 B1 * | 11/2021 | Dorner .................. G06F 16/738 |
| 2004/0236843 A1 | 11/2004 | Wing et al. |
| 2005/0262378 A1 | 11/2005 | Sleeman et al. |
| 2007/0174185 A1 | 7/2007 | McGoveran |
| 2009/0044049 A1 | 2/2009 | Luick |
| 2009/0158099 A1 * | 6/2009 | Cui ..................... G06F 11/0778 714/57 |
| 2015/0286858 A1 * | 10/2015 | Shaburov ................ G10L 25/63 382/103 |
| 2020/0020319 A1 * | 1/2020 | Malhotra .............. G10L 15/063 |

\* cited by examiner

ERROR REPAIR TOOL USING SENTIMENT ANALYSIS

TECHNICAL FIELD

This disclosure relates generally to repairing errors in software applications.

BACKGROUND

Software applications are developed using source code. Sometimes, the source code includes bugs that cause errors when executed.

SUMMARY OF THE DISCLOSURE

Software applications are developed using source code. These software applications are executed on devices to perform particular functions. Sometimes, the source code includes bugs that cause errors when the software application is executed. In conventional software development environments, the users of these devices contact the developer of the software application to identify the error. The developer logs error that the user is experiencing and in time, implements changes to the source code to fix the error. This process may take months or years depending on the developer's availability and the impact of the error. And in many instances, the change to the source code may not fix the error or may cause additional errors to occur. Additionally, as developers move and change jobs, the knowledge needed to fix bugs in the software application may be lost, which results in new developers attempting to fix old or reoccurring bugs in an inconstant or nonuniform manner that could introduce additional bugs.

Moreover, these software fixes are conventionally developed without knowledge of the emotional impact that the bug or error has on the user. Even though a developer may believe that a particular bug or error is minor or trivial, this bug or error may have a tremendous impact on the user and may cause significant emotional stress for the user. When the change to fix a bug takes months, or when the change does not fix the bug or introduces additional bugs, it may result in the user deleting the software application or refusing to use the software application.

This disclosure contemplates an error repair tool that uses sentiment analysis in automatically repairing software bugs. The tool analyzes a video from a user that describes a software bug or error to determine an emotional intensity of the user and to determine the bug or error being described. If the emotional intensity is high, the tool may determine to automatically fix the bug or error based on solutions implemented to fix prior bugs or errors. In this manner, the tool automatically fixes bugs or errors that cause emotional distress for a user. If the emotional intensity is not high or if the tool cannot determine a suitable fix for the bug or error, the tool may alert a developer of the bug or error.

According to an embodiment, an apparatus includes a memory and a hardware processor. The memory stores a plurality of previous software errors and a plurality of solutions to the plurality of previous software errors. The processor receives a video of a user describing an error in a software application and tracks a facial feature of the user to determine an emotional intensity. The processor converts an audio portion of the video to a text file and analyzes the text file to determine the error. In response to the emotional intensity exceeding a threshold, the processor determines, based on the plurality of previous software errors, a series of steps that, when performed, replicate the error, determines, based on the series of steps and the plurality of solutions, a change to the source code of the application that fixes the error, and implements the change to the software code.

According to another embodiment, a method includes storing, by a memory, a plurality of previous software errors and a plurality of solutions to the plurality of previous software errors and receiving, by a hardware processor communicatively coupled to the memory, a video of a user describing an error in a software application. The method also includes tracking, by the processor, a facial feature of the user to determine an emotional intensity and converting, by the processor, an audio portion of the video to a text file. The method further includes analyzing, by the processor, the text file to determine the error and in response to the emotional intensity exceeding a threshold, determining, by the processor, based on the plurality of previous software errors, a series of steps that, when performed, replicate the error, determining, by the processor, based on the series of steps and the plurality of solutions, a change to the source code of the application that fixes the error, and implementing, by the processor, the change to the software code.

According to yet another embodiment, a system includes a device and an error repair tool. The device executes a software application. The error repair tool stores a plurality of previous software errors and a plurality of solutions to the plurality of previous software errors and receives a video from the device of a user describing an error in the software application. The error repair tool also tracks a facial feature of the user to determine an emotional intensity and converts an audio portion of the video to a text file. The error repair tool further analyzes the text file to determine the error and in response to the emotional intensity exceeding a threshold, determines, based on the plurality of previous software errors, a series of steps that, when performed, replicate the error, determines, based on the series of steps and the plurality of solutions, a change to the source code of the application that fixes the error, and implements the change to the software code.

Certain embodiments provide one or more technical advantages. For example, an embodiment automatically fixes software bugs or errors that cause emotional distress for users. As another example, an embodiment identifies software bugs or errors that cause emotional distress for users through sentiment analysis. Certain embodiments may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present disclosure, reference is now made to the following description, taken in conjunction with the accompanying drawings, in which.

DETAILED DESCRIPTION

Figure 1:
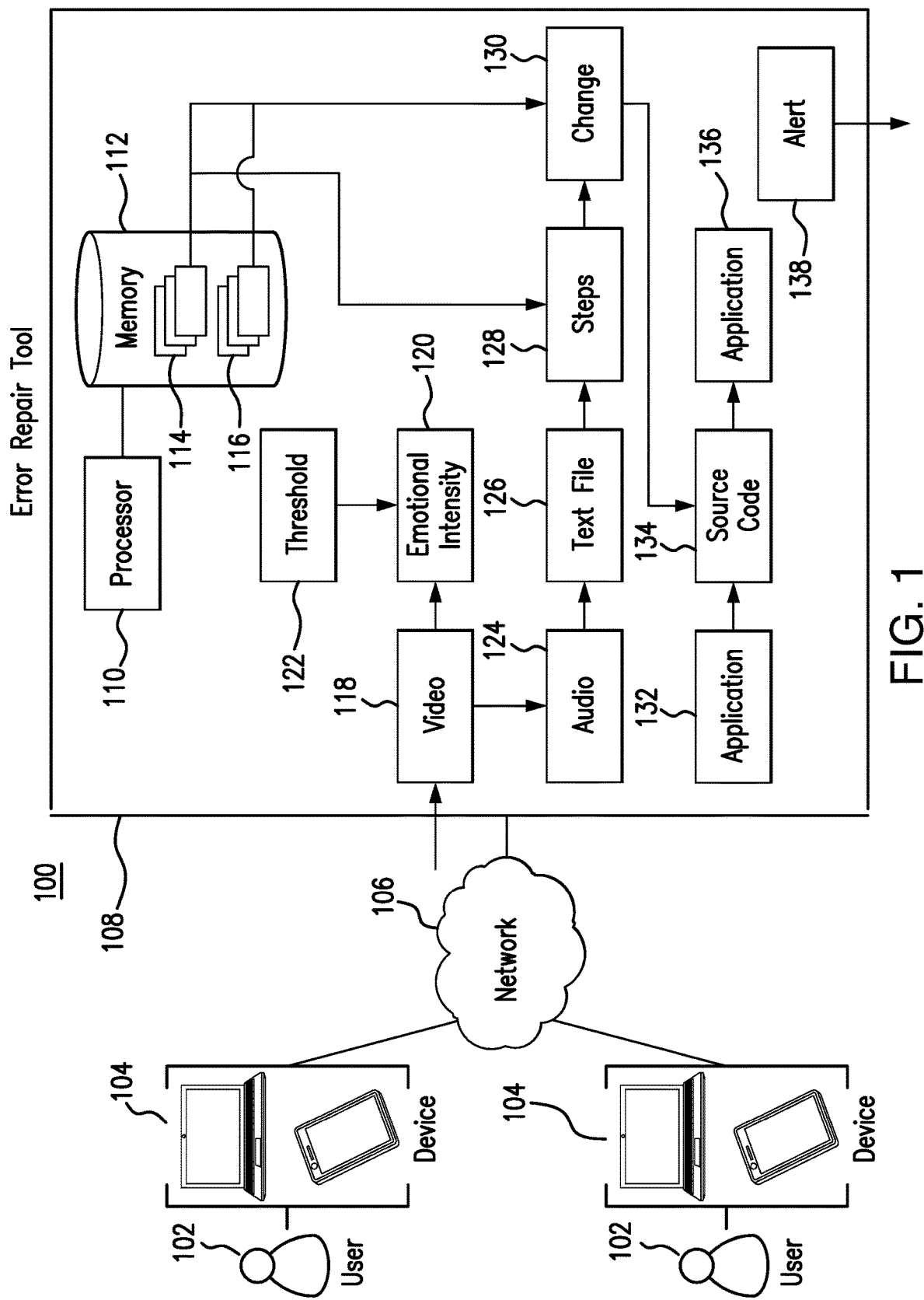
FIG. 1 illustrates an example system.
Figure 2A:
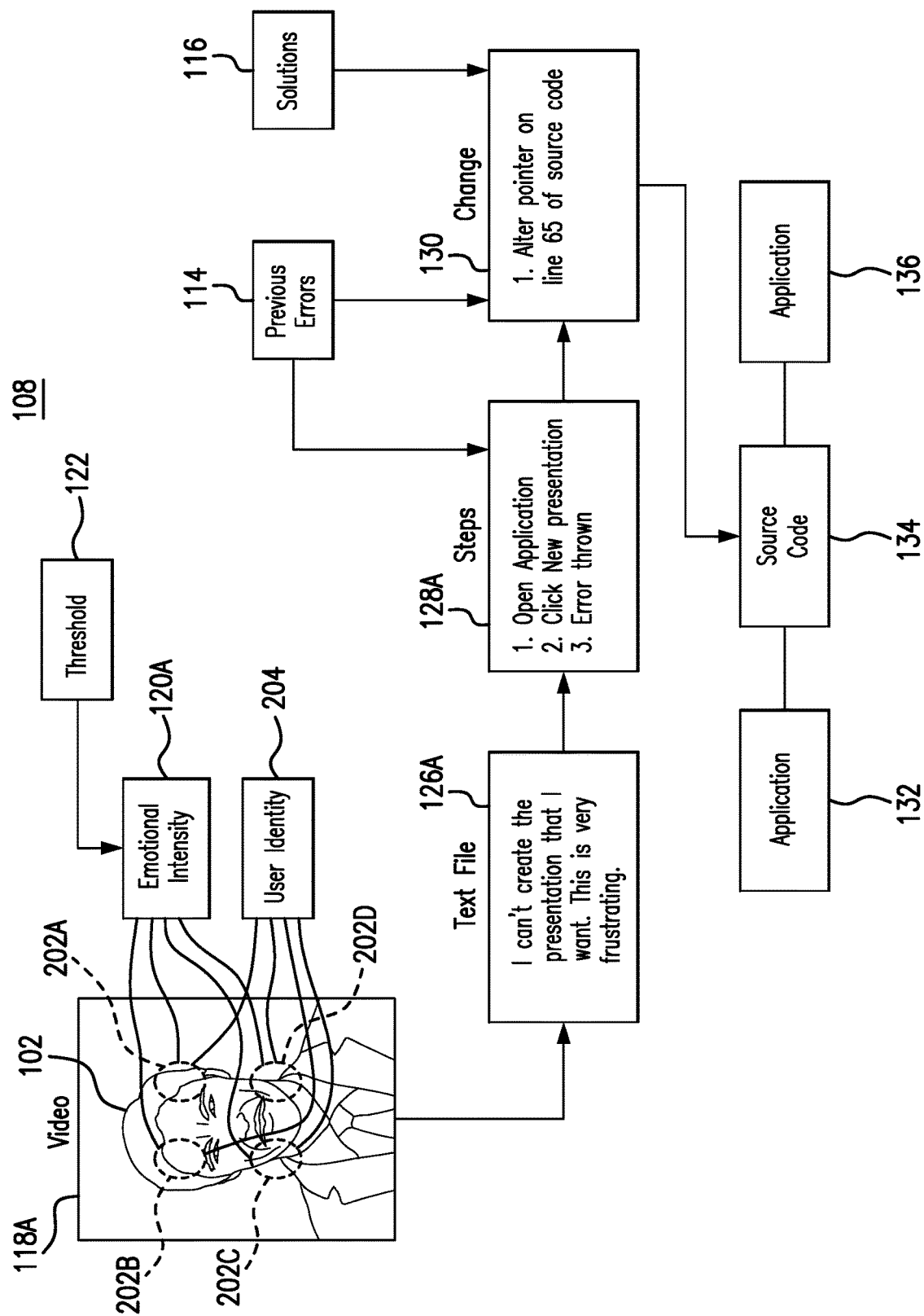
FIGS. 2A-2C illustrate the operation of an example error repair tool of the system of FIG. 1.
Figure 2B:
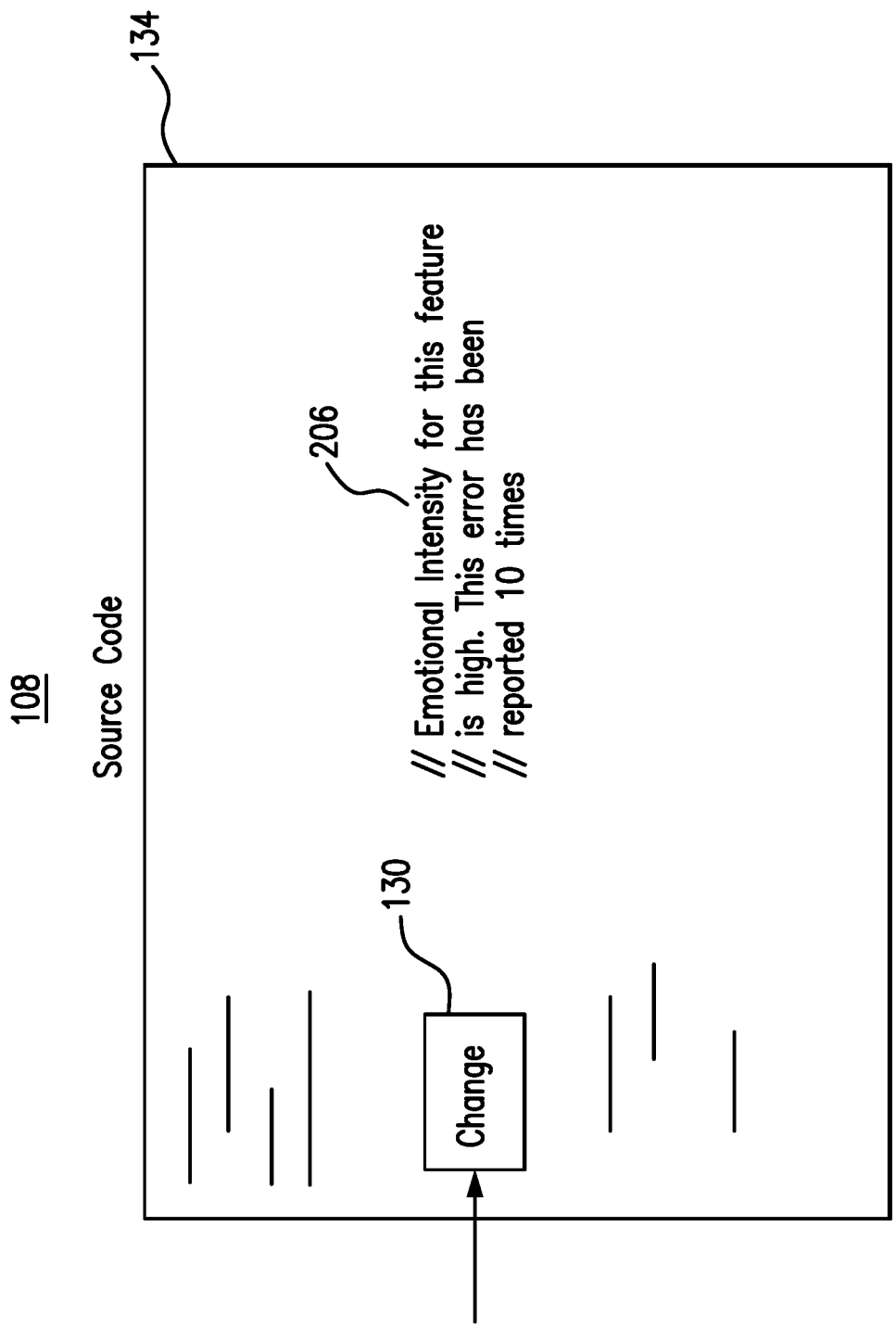
Figure 2C:
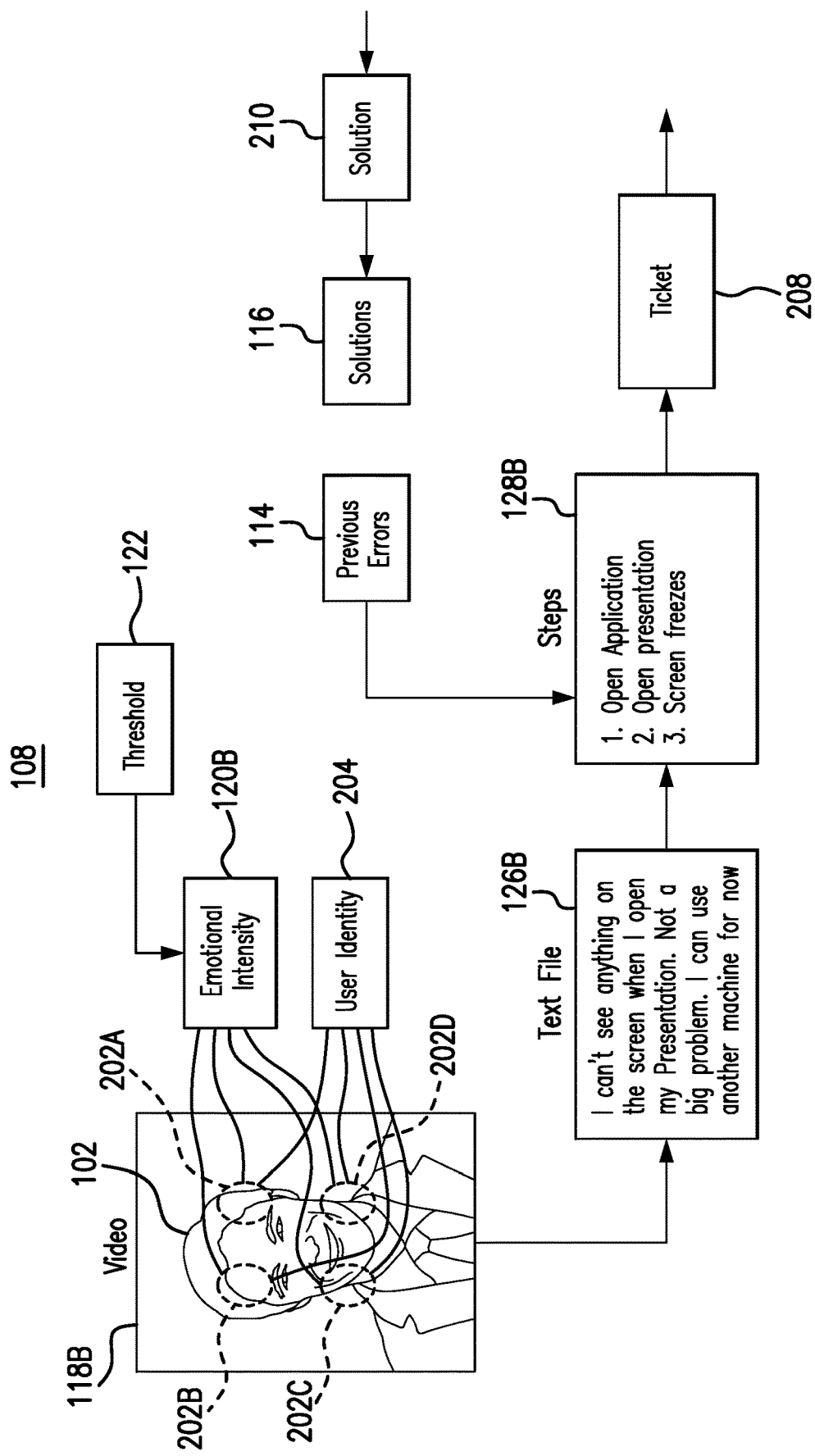
Figure 3:
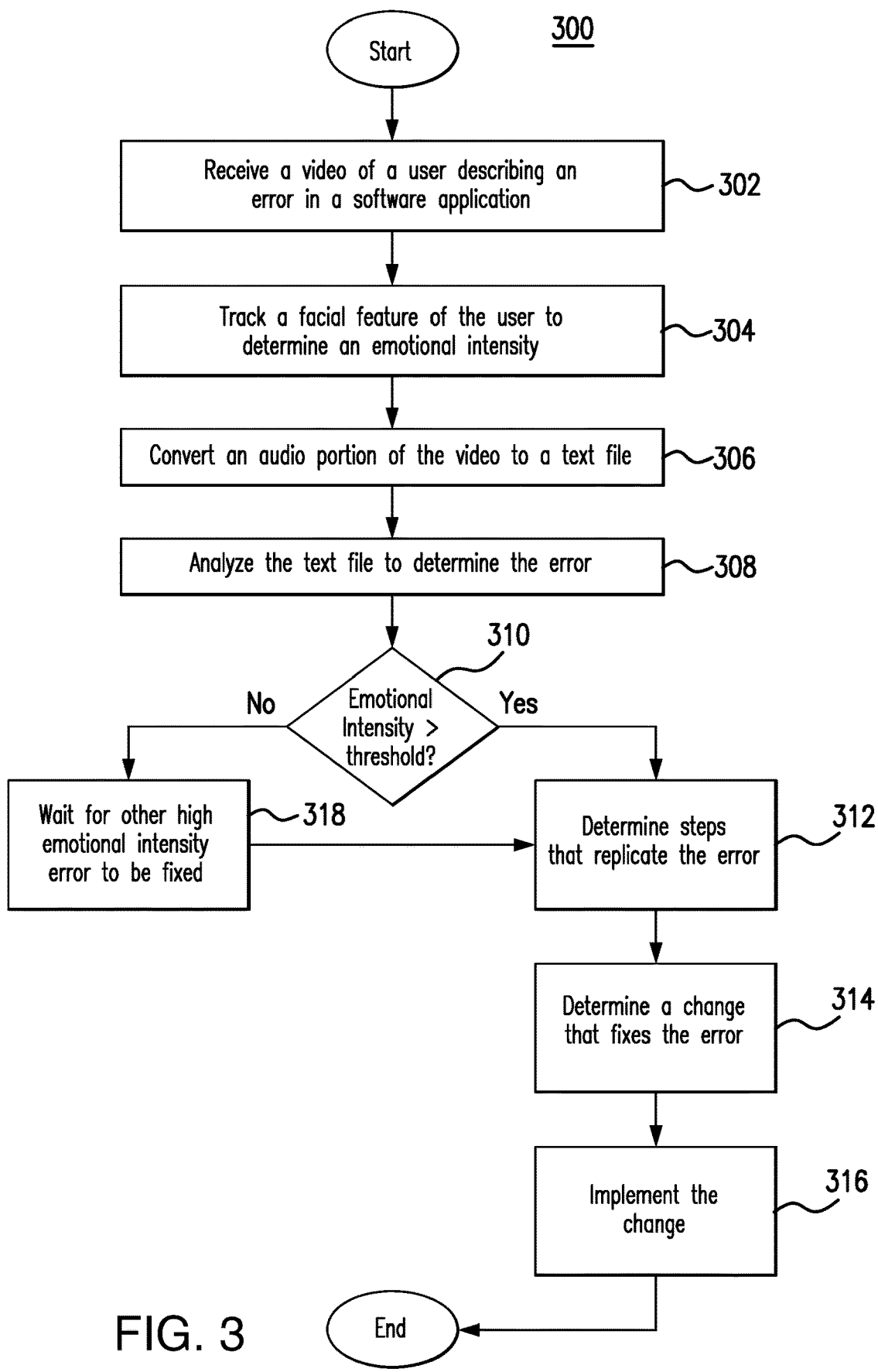
FIG. 3 is a flowchart illustrating a method for repairing software bugs or errors using the system of FIG. 1.

Embodiments of the present disclosure and its advantages are best understood by referring to FIGS. 1 through 3 of the drawings, like numerals being used for like and corresponding parts of the various drawings.

Software applications are developed using source code. These software applications are executed on devices to perform particular functions. Sometimes, the source code includes bugs that cause errors when the software application is executed. In conventional software development environments, the users of these devices contact the developer of the software application to identify the error. The developer logs error that the user is experiencing and in time, implements changes to the source code to fix the error. This process may take months or years depending on the developer's availability and the impact of the error. And in many instances, the change to the source code may not fix the error or may cause additional errors to occur. Additionally, as developers move and change jobs, the knowledge needed to fix bugs in the software application may be lost, which results in new developers attempting to fix old or reoccurring bugs in an inconstant or nonuniform manner that could introduce additional bugs.

Moreover, these software fixes are conventionally developed without knowledge of the emotional impact that the bug or error has on the user. Even though a developer may believe that a particular bug or error is minor or trivial, this bug or error may have a tremendous impact on the user and may cause significant emotional stress for the user. When the change to fix a bug takes months, or when the change does not fix the bug or introduces additional bugs, it may result in the user deleting the software application or refusing to use the software application.

This disclosure contemplates an error repair tool that uses sentiment analysis in automatically repairing software bugs. The tool analyzes a video from a user that describes a software bug or error to determine an emotional intensity of the user and to determine the bug or error being described. If the emotional intensity is high, the tool may determine to automatically fix the bug or error based on solutions implemented to fix prior bugs or errors. In this manner, the tool automatically fixes bugs or errors that cause emotional distress for a user. If the emotional intensity is not high or if the tool cannot determine a suitable fix for the bug or error, the tool may alert a developer of the bug or error. The error repair tool will be described in more detail using FIGS. 1 through 3.

FIG. 1 illustrates an example system 100. As seen in FIG. 1 system 100 includes one or more devices 104, a network 106, and an error repair tool 108. Generally, error repair tool 108 fixes bugs and/or errors in software code using sentiment analysis. Error repair tool 108 analyzes videos of users 102 reporting bugs and/or errors to gauge an emotional intensity of the user 102. Error repair tool 108 then determines whether an automatic fix should be implemented for the bug and/or error. In this manner, error repair tool 108 automatically fixes bugs and/or errors in software code that cause distress for user 102.

Users 102 use devices 104 to interact with other components of system 100. For example, user 102 may use devices 104 to execute applications that perform certain functions on behalf of user 102. These applications may include bugs and/or errors that negatively impact the execution of the application. Certain bugs or errors may be significant enough to cause emotional distress to particular users 102 while certain bugs or errors may be trivial to certain users 102. In other words, each bug or error may impact users 102 differently depending on the desires and expectations of the user 102 for the application.

Users 102 may use devices 104 to report bugs or errors to the developer of the application. When reported the developer may log the bug or error and begin developing a fix for the bug or error. After the fix is developed the developer may provide an update to user 102 to fix the bug or error. This process may take weeks or months. Additionally, this process does not take into account the emotional strain that the bug or error causes for the user 102. As a result when the update does not fix the bug or error, when the update introduces new bugs or errors, or when the update takes too long to develop, it may exacerbate the strain on the user 102 causing the user 102 stops using the application.

Users 102 may video conference with a developer using devices 104 to report a bug and/or error. For example, user 102 may use a camera and/or microphone on devices 104 to communicate a video with an audio portion to the developer. The video may report the bug and/or error.

Devices 104 include any appropriate device for communicating with components of system 100 over network 106. For example, devices 104 may be a telephone, a mobile phone, a computer, a laptop, a tablet, an automated assistant, and/or a cash register. This disclosure contemplates device 104 being any appropriate device for sending and receiving communications over network 106. As an example and not by way of limitation, device 104 may be a computer, a laptop, a wireless or cellular telephone, an electronic notebook, a personal digital assistant, a tablet, or any other device capable of receiving, processing, storing, and/or communicating information with other components of system 100. Device 104 may also include a user interface, such as a display, a microphone, keypad, or other appropriate terminal equipment usable by user 102. In some embodiments, an application executed by device 104 may perform the functions described herein.

Network 106 allows communication between and amongst the various components of system 100. For example, user 102 may use devices 104 to communicate over network 106. This disclosure contemplates network 106 being any suitable network operable to facilitate communication between the components of system 100. Network 106 may include any interconnecting system capable of transmitting audio, video, signals, data, messages, or any combination of the preceding. Network 106 may include all or a portion of a public switched telephone network (PSTN), a public or private data network, a local area network (LAN), a metropolitan area network (MAN), a wide area network (WAN), a local, regional, or global communication or computer network, such as the Internet, a wireline or wireless network, an enterprise intranet, or any other suitable communication link, including combinations thereof, operable to facilitate communication between the components.

Error repair tool 108 uses sentiment analysis in developing fixes for reported bugs and/or errors. As seen in FIG. 1, error repair tool 108 includes a processor 110 and a memory 112. This disclosure contemplates processor 110 and memory 112 being configured to perform any of the functions of error repair tool 108 described herein. In certain embodiments, error repair tool 108 automatically fixes software bugs or errors that cause emotional distress for users. In certain embodiments error repair tool 108 identifies software bugs or errors that cause emotional distress for users through sentiment analysis.

Processor 110 is any electronic circuitry, including, but not limited to microprocessors, application specific integrated circuits (ASIC), application specific instruction set processor (ASIP), and/or state machines, that communicatively couples to memory 112 and controls the operation of error repair tool 108. Processor 110 may be 8-bit, 16-bit, 32-bit, 64-bit or of any other suitable architecture. Processor 110 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. Processor 110 may include other hardware that operates software to control and process information. Processor 110 executes software stored on memory to perform any of the functions described herein. Processor 110 controls the operation and administration of error repair tool 108 by processing information received from devices 104, network 106, and memory 112. Processor 110 may be a programmable logic device, a microcontroller, a microprocessor, any suitable processing device, or any suitable combination of the preceding. Processor 110 is not limited to a single processing device and may encompass multiple processing devices.

Memory 112 may store, either permanently or temporarily, data, operational software, or other information for processor 110. Memory 112 may include any one or a combination of volatile or non-volatile local or remote devices suitable for storing information. For example, memory 112 may include random access memory (RAM), read only memory (ROM), magnetic storage devices, optical storage devices, or any other suitable information storage device or a combination of these devices. The software represents any suitable set of instructions, logic, or code embodied in a computer-readable storage medium. For example, the software may be embodied in memory 112, a disk, a CD, or a flash drive. In particular embodiments, the software may include an application executable by processor 110 to perform one or more of the functions described herein.

Error repair tool 108 stores one or more previous software errors 114.

Previous software errors 114 include errors that have occurred previously when executing an application 132. Error repair tool 108 may reference these previous software errors 114 to determine whether one or more of the errors 114 are occurring again and to determine an appropriate fix for the error 114. The one or more previous errors 114 may include or indicate a series of steps that when performed replicate the error 114.

Error repair tool 108 stores one or more solutions 116. Solutions 116 may have been implemented previously to resolve one or more of the previous software errors 114. Solutions 116 may include a series of steps and/or changes that were implemented to fix one or more previous errors 114. Error repair tool 108 may reference solutions 116 to determine a fix for a bug or error reported by a user 102.

Error repair tool 108 receives a video 118. Video 118 may be of a user 102 reporting a bug or error when executing application 132. User 102 may have generated video 118 using devices 104 such as, for example, by using a camera and a microphone of device 104. Video 118 may include a shot of the users 102 face. Error repair tool 108 may analyze features of the user's 102 face to determine if the bug or error is causing the user 102 distress. Video 118 may also include an audio portion 124 that includes the words spoken by user 102. Error repair tool 108 may analyze the audio portion 124 to determine the bug and/or error being reported. In some embodiments, error repair tool 108 may further analyze the audio portion 124 to determine if the bug or error is causing the user 102 distress.

Error repair tool 108 determines an emotional intensity 120 of user 102 by analyzing video 118. In certain embodiments, error repair tool 108 analyzes facial features of user 102 as seen in frames of video 118. Error repair tool 108 may track these facial features to gauge the emotional impact of a bug and/or error on user 102. For example, if a user 102 is scowling and/or frowning when reporting a bug and/or error, then error repair tool 108 may determine a high emotional intensity 120 for the user 102. As another example, if user 102 is smiling and appears relaxed when reporting the bug and/or error, error repair tool 108 may determine a low emotional intensity 120 for the bug and/or error.

Error repair tool 108 may determine whether emotional intensity 120 exceeds a threshold 122 to determine whether an automatic fix should be implemented for the bug and/or error. If emotional intensity 120 exceeds threshold 122, error repair tool 108 may determine that a bug and/or error is causing emotional distress for a user 102 and that an automatic fix should be developed quickly for the bug and/or error. On the other hand, if emotional intensity 120 is below the threshold 122, error repair tool 108 may determine that bug and/or error is not causing emotional distress for user 102 and that a fix for the bug and/or error may be given lower priority. Error repair tool 108 may adjust threshold 122 as error repair tool 108 learns how to gauge the facial features of users 102. For example, if a sufficient number of users 102 remain calm while reporting bugs and/or errors that cause them great emotional distress, error repair tool 108 may lower threshold 122 to properly assess the emotional intensity 120 of these users 102. As another example, if a sufficient number of users 102 feign anger when reporting a bug and/or error, error repair tool 108 may raise threshold 122 to properly assess the emotional intensity 120 of these users 102.

Error repair tool 108 analyzes an audio portion 124 of video 118 to determine the bug or error being reported by user 102. Audio portion 124 may include a file and/or signal that when played produces an audible signal of the words spoken by user 102. Error repair tool 108 may analyze audio portion 124 to produce a text file 126 that includes a text representation of the words spoken by user 102. Error repair tool 108 may use natural language processing and/or transcription software to convert audio portion 124 to text file 126. Error repair tool 108 may analyze the words in text file 126 to determine the bug and/or error being reported. Error repair tool 108 may use natural language processing to analyze the words and/or speech patterns represented in text file 126 to identify the bug and/or error that is being reported by user 102.

Error repair tool 108 may reference previous software errors 114 to determine the bug and/or error that is being reported by user 102. For example, error repair tool 108 may compare certain words of text file 126 with words in previous software errors 114 to identify the bug and/or error that is being reported by user 102. Error repair tool 108 may then determine a series of steps 128 that when performed replicate the reported error and/or bug. In certain embodiments, error repair tool 108 determines steps 128 by analyzing text file 126. For example, user 102 may have reported the actions that the user 102 performed to encounter the bug and/or error. Error repair tool 108 may determine the steps 128 to replicate the bug and/or error through the reported actions performed by user 102 (e.g., by using natural language processing on the words in text file 126 to determine the actions taken by user 102). In certain embodiments error repair tool 108 determines steps 128 by referencing the steps that are stored with the previous software errors 114. If user 102 did not report the actions that user 102 performed to encounter the bug and/or error, but error repair tool 108 has identified that the bug and/or error reported by user 102 had previously occurred, then error repair tool 108 may use the steps 128 that were stored with the previous error 114.

Error repair tool 108 may determine changes 130 that should be implemented to fix the reported bug and/or error based on the steps 128 that replicate the bug and/or error. In certain embodiments, error repair tool 108 also determines the change 130 based on the previous errors 114 and solutions 116. For example, error repair tool 108 may determine that the steps 128 are consistent with certain errors 114 and solutions 116. Error repair tool 108 may reference the solutions 116 to determine change 130. Change 130 may incorporate one or more aspects of the solutions 116.

Error repair tool 108 may implement change 130. For example, error repair tool 108 may adjust the source code 134 of the application 132 by including the change 130 in the source code 134. Error repair tool 108 may decompile application 132 to produce source code 134. Error repair tool 108 may then include change 130 into source code 134. Error repair tool 108 may then recompile source code 134 to produce application 136. Application 136 may be the same as application 132 except with the implemented change 130 to source code 134. Error repair tool 108 may then deploy application 136 to the devices 104 to resolve the reported bug and/or error. In this manner, error repair tool 108 may automatically fix a reported bug and/or error without engaging a lengthy development process.

In particular embodiments, error repair tool 108 generates and communicates an alert 138 that indicates that change 130 has been developed and implemented. Users 102 and a developer may see alert 138 and be informed that change 130 has been implemented to correct the reported bug and/or error. In this manner, the emotional distress experienced by user 102 may be reduced because the user 102 is informed that a bug and/or error has been resolved.

FIGS. 2A-2C illustrate the operation of an example error repair tool 108 of the system 100 of FIG. 1. In FIG. 2A, error repair tool 108 receives a video 118A. Video 118A shows a user 102 reporting a bug and/or error with an application 132. User 102 may have used device 104 to generate and communicate video 118A. In video 118A, the user 102 appears angry or upset when recording the bug and/or error. As a result, it may be inferred that the bug and/or error is causing the user 102 emotional distress. In certain embodiments, error repair tool 108 may authenticate user 102 using video 118. For example, error repair tool 108 may analyze the facial features 202 of user 102 to identify user 102. Error repair tool 108 may compare these facial features 202 with a database of facial features of different users 102 to determine which user 102 is in video 118.

Error repair tool 108 analyzes facial features 202 of user 102 in video 118A to determine an emotional intensity 120A of user 102 while reporting the bug and/or error. Facial feature 202A is located near the left temple of user 102. Facial feature 202B is located on the forehead above the right eye of user 102. Facial feature 202C is located near the right cheek of user 102. Facial feature 202D is located near the left cheek of user 102. These facial features 202 may reveal if user 102 is in emotional distress. For example, facial features 202A and 202B may reveal that user 102 is scowling or upset. As another example, facial features 202C and 202D may show whether user 102 is smiling, frowning, agitated, or calm. Error repair tool 108 may analyze these facial features 202 to determine an emotional intensity 120A for user 102. For example, if facial features 202A and 202B show that the muscles above user's 102 eyes are tense and facial features 202C and 202D show that user 102 is frowning or scowling, then error repair tool 108 may determine a high emotional intensity 120A for user 102. Error repair tool 108 may compare emotional intensity 120A to threshold 122 to determine whether emotional intensity 120A is high or low. Based on this comparison, error repair tool 108 may determine that emotional intensity 120A is high, which indicates that the bug or error being reported by user 102 is causing user 102 emotional distress. In response to that determination, error repair tool 108 may determine that the bug or error should be automatically fixed quickly. This disclosure contemplates error repair tool 108 analyzing any suitable feature of user 102 to determine emotional intensity 120.

Error repair tool 108 analyzes an audio portion of video 118A to generate a text file 126A. Text file 126A includes the text representation of the words spoken by user 102. As seen in FIG. 2A, text file 126A includes the words, "I can't create the presentation that I want. This is very frustrating." Error repair tool 108 may use natural language processing to analyze the words in text file 126A to determine the bug or error that is being reported. Through this analysis, error repair tool 108 may determine that user 102 is encountering a bug or error when creating a new presentation.

Error repair tool then determines steps 128A that, when performed, replicate the error. Error repair tool may use natural language processing on text file 126A to determine if user 102 reported the steps 128A that replicate the bug or error. In some embodiments, error repair tool 108 references previous errors 114 to determine steps 128A that replicate the bug or error reported by user 102. Using the previous example, error repair tool 108 may reference previous errors 114 that were encountered when creating a new presentation. Error repair tool 108 may determine steps 128A to be:
1. open application;
2. click new presentation; and
3. error thrown.

Error repair tool 108 may determine steps 128A based on steps reported by user 102 or by referencing steps that are stored with previous errors 114 encountered when creating a new presentation.

After determining steps 128A, error repair tool 108 may determine a change 130 that should be implemented to correct the reported bug or error. Error repair tool 108 may reference previous errors 114 and solutions 116 to determine change 130. Solutions 116 may have been implemented to fix one or more previous errors 114. So, error repair tool 108 may determine one or more portions of change 130 based on these previous solutions 116. In the example of FIG. 2A, error repair tool 108 determines that change 130 should be repaired by altering a pointer on line 65 of source code 134 of application 132.

Error repair tool 108 implements change 130 in source code 134. In certain embodiments, error repair tool 108 may decompile application 132 to produce source code 134. Error repair tool 108 may then make the change 130 in source code 134. In the example of FIG. 2A, error repair tool 108 may alter a pointer on line 65 of source code 134. Error repair tool 108 may then recompile source code 134 to produce application 136. Error repair tool 108 may communicate application 136 to user 102 to fix the bug or error reported by user 102.

FIG. 2B shows error repair tool 108 implementing change 130 in source code 134. In this example, error repair tool 108 implements change 130 in source code 134 by changing portions of source code 134. According to the example in FIG. 2A, change 130 involves altering a pointer on line 65 of source code 134.

In certain embodiments, error repair tool 108 adds comments 206 that accompany change 130. Comments 206 may indicate an emotional intensity 120 associated with change 130. Additionally, comments 206 may indicate the number of times that a particular bug or error fixed by change 130 has been reported. In the example of FIG. 2B, comments 206 indicate that the emotional intensity corresponding to change 130 is high and the bug or error that was fixed by change 130 had been reported 10 times.

FIG. 2C includes an example when user 102 did not experience emotional distress when reporting a bug or error. Error repair tool 108 receives a video 118B that shows user 102. As with the example of FIG. 2A, video 118B includes one or more facial features 202 that are analyzed by error repair tool 108. Facial features 202A, 202B, 202C and 202D may indicate that user 102 is calm or happy when reporting the bug or error. Error repair tool 108 may analyze these facial features 202 to determine an emotional intensity 120B. Emotional intensity 120B may be below threshold 122 thereby indicating that the bug or error is not causing user 102 emotional distress. Error repair tool 108 may handle the bug or error differently when emotional intensity 120B is below threshold 122.

Error repair tool 108 generates text file 126B based on the words spoken by user 102 in video 118B. In the example FIG. 2C, text file 126B states, "I can't see anything on the screen when I open my presentation. Not a big problem. I can use another machine for now." Error repair tool 108 may use natural image processing to analyze the text in text file 126B to determine the bug or error being reported. In this example, error repair tool 108 may determine that the bug or error is that nothing displays when user 102 opens a presentation. Error repair tool 108 references previous errors 114 to determine the steps 128B that when performed, replicate the bug or error reported by user 102. Error repair tool 108 may determine that the bug or error being reported is that a presentation is throwing an error when opened. Error repair tool 108 may determine that steps 128B are:
1. open application;
2. open presentation; and
3. screen freezes.

Because the bug or error being reported is not causing emotional distress, error repair tool 108 may assign a lower priority to the bug or error. Error repair tool 108 may first fix bugs or errors that have a high emotional intensity 120 before resolving the bug or error reported by user 102 in video 118B.

In certain embodiments error repair tool 108 generates and issues a ticket 208 that reports on the bug or error. Ticket 208 may be sent to a developer so that the developer may be informed of the error. In response, the developer may fix the bug or error. In some embodiments, ticket 208 includes steps 128B so that the developer can quickly replicate the bug or error reported by user 102. In this manner, the bug or error can be fixed, but not quickly or automatically by error repair tool 108. This allows error repair tool 108 to devote its resources to repairing bugs or errors that are causing emotional distress.

In certain instances the bug or error reported by user 102 is new and so, error repair tool 108 may not know the appropriate change to be made to fix the bug or error. In these instances, error repair tool 108 may alert a developer and then monitor the actions taken by the developer's actions to learn what change should be made in the future when a similar bug or error is encountered. Error repair tool 108 may create solution 210 based on the actions taken by the developer to fix the bug or error. Error repair tool 108 may then store solution 210 with solutions 116 so that error repair tool 108 may reference solution 210 in the future. Solution 210 may include, for example, changing a configuration file, updating underlying data used by application 132, and/or changing source code 134.

FIG. 3 is a flow chart illustrating a method 300 for repairing software bugs or errors using system 100 of FIG. 1. In certain embodiments, error repair tool 108 performs the steps of method 300. By performing method 300, error repair tool 108 can quickly and automatically fix software bugs or errors that are causing emotional distress for users 102.

Error repair tool 108 receives a video 118 of a user 102 describing an error in the software application 132 in step 302. In step 304, error repair tool 108 tracks the facial features 202 of the user 102 to determine an emotional intensity 120. The emotional intensity 120 may indicate the level of distress that the bug or error is causing the user 102. Error repair tool 108 may analyze any suitable facial features 202 of the user 102 to determine the emotional intensity 120.

Error repair tool 108 converts an audio portion 124 of the video 118 to a text file 126 in step 306. Error repair tool 108 may use any suitable transcription process for generating the text file 126. In step 308, error repair tool 108 analyzes the text file 126 to determine the error. Error repair tool 108 may use natural language processing to analyze the words in the text file 126 to identify the bug or error being recorded by the user 102.

Error repair tool 108 determines whether the determined emotional intensity 120 is greater than the threshold 122 in step 310. If the emotional intensity 120 exceeds threshold 122, then error repair tool 108 may determine that the bug or errors cause emotional distress for the user 102 and that the bug or error should be automatically fixed. In steps 312, error repair tool 108 determines steps 128 that replicate the error. Error repair tool 108 may reference previous errors 114 to determine the steps 128. In step 314, error repair tool 108 determines the change 130 that fixes the error. Error repair tool 108 may reference previous errors 114 and solutions 116 to determine the appropriate change 130 that fixes the bug or error. Error repair tool 108 implements the change 130 in step 316. In some embodiments, error repair tool 108 decompiles the application 132 and implements the change 130 in the source code 134 of the application 132. Error repair tool 108 then recompiles the source code 134 to produce another application 136. Error repair tool 108 communicates this application 136 to the user 102 to resolve the bug or error.

If error repair tool 108 determines that the emotional intensity 120 did not exceed the threshold 122, then error repair tool 108 may determine that the bug or error did not cause emotional distress for the user 102. In response, error repair tool 108 may wait for other high emotional intensity errors to be fixed in step 318. In other words, error repair tool 108 may assign a lower priority to the bug or error and when other higher priority bugs or errors have been fixed, error repair tool 108 may turn to resolve the lower priority bugs and/or errors. In this manner, error repair tool 108 may quickly repair bugs and/or errors that are causing users emotional distress.

Modifications, additions, or omissions may be made to method 300 depicted in FIG. 3. Method 300 may include more, fewer, or other steps. For example, steps may be performed in parallel or in any suitable order. While discussed as error repair tool 108 performing the steps, any suitable component of system 100, such as device(s) 104 for example, may perform one or more steps of the methods.

Although the present disclosure includes several embodiments, a myriad of changes, variations, alterations, transformations, and modifications may be suggested to one skilled in the art, and it is intended that the present disclosure encompass such changes, variations, alterations, transformations, and modifications as fall within the scope of the appended claims.

What is claimed is:

1. An apparatus comprising:
   a memory configured to store a plurality of previous software errors and a plurality of solutions to the plurality of previous software errors; and
   a hardware processor communicatively coupled to the memory, the hardware processor configured to:
   receive a video of a user describing an error in a software application;
   track a facial feature of the user to determine an emotional intensity;
   convert an audio portion of the video to a text file;
   analyze the text file to determine the error;
   in response to the emotional intensity exceeding a threshold:
   determine, based on the plurality of previous software errors, a series of steps that, when performed, replicate the error;
   determine, based on the series of steps and the plurality of solutions, a change to the source code of the application that fixes the error; and
   implement the change to the software code.

2. The apparatus of claim 1, wherein the hardware processor is further configured to insert into the source code a comment that indicates the determined emotional intensity.

3. The apparatus of claim 1, wherein the hardware processor is further configured to insert into the source code a comment that indicates a number of occurrences of the error.

4. The apparatus of claim 1, wherein the hardware processor is further configured to:
   receive a second video of a second user describing a second error in the software application;
   track a facial feature of the second user to determine a second emotional intensity;
   convert an audio portion of the second video to a second text file;
   analyze the second text file to determine the second error;
   in response to the second emotional intensity exceeding the threshold:
   determine, based on the plurality of previous software errors, a second series of steps that, when performed, replicate the second error;
   determine, based on the series of steps and the plurality of solutions, that a ticket should be issued for the second error;
   determine, based on steps taken in response to the ticket, a solution for the second error; and
   add the solution for the second error to the plurality of solutions.

5. The apparatus of claim 1, wherein the hardware processor is further configured to authenticate the user based on the video.

6. The apparatus of claim 1, wherein the hardware processor is further configured to, after the change to the software code has been implemented, determine a second change to the software code for a second error that corresponds to a second emotional intensity that does not exceed the threshold.

7. The apparatus of claim 1, wherein the hardware processor is further configured to present an alert that the change has been implemented.

8. A method comprising:
   storing, by a memory, a plurality of previous software errors and a plurality of solutions to the plurality of previous software errors;
   receiving, by a hardware processor communicatively coupled to the memory, a video of a user describing an error in a software application;
   tracking, by the processor, a facial feature of the user to determine an emotional intensity;
   converting, by the processor, an audio portion of the video to a text file;
   analyzing, by the processor, the text file to determine the error;
   in response to the emotional intensity exceeding a threshold:
   determining, by the processor, based on the plurality of previous software errors, a series of steps that, when performed, replicate the error;
   determining, by the processor, based on the series of steps and the plurality of solutions, a change to the source code of the application that fixes the error; and
   implementing, by the processor, the change to the software code.

9. The method of claim 8, further comprising inserting, by the processor, into the source code a comment that indicates the determined emotional intensity.

10. The method of claim 8, further comprising inserting, by the processor, into the source code a comment that indicates a number of occurrences of the error.

11. The method of claim 8, further comprising:
    receiving, by the processor, a second video of a second user describing a second error in the software application;
    tracking, by the processor, a facial feature of the second user to determine a second emotional intensity;
    converting, by the processor, an audio portion of the second video to a second text file;
    analyzing, by the processor, the second text file to determine the second error;
    in response to the second emotional intensity exceeding the threshold:
    determining, by the processor, based on the plurality of previous software errors, a second series of steps that, when performed, replicate the second error;
    determining, by the processor, based on the series of steps and the plurality of solutions, that a ticket should be issued for the second error;
    determining, by the processor, based on steps taken in response to the ticket, a solution for the second error; and
    adding, by the processor, the solution for the second error to the plurality of solutions.

12. The method of claim 8, further comprising authenticating, by the processor, the user based on the video.

13. The method of claim 8, further comprising, after the change to the software code has been implemented, determining, by the processor, a second change to the software code for a second error that corresponds to a second emotional intensity that does not exceed the threshold.

14. The method of claim 8, further comprising presenting, by the processor, an alert that the change has been implemented.

15. A system comprising:
a device configured to execute a software application;
an error repair tool configured to:
store a plurality of previous software errors and a plurality of solutions to the plurality of previous software errors;
receive a video from the device of a user describing an error in the software application;
track a facial feature of the user to determine an emotional intensity;
convert an audio portion of the video to a text file;
analyze the text file to determine the error;
in response to the emotional intensity exceeding a threshold:
determine, based on the plurality of previous software errors, a series of steps that, when performed, replicate the error;
determine, based on the series of steps and the plurality of solutions, a change to the source code of the application that fixes the error; and
implement the change to the software code.

16. The system of claim 15, wherein the error repair tool is further configured to insert into the source code a comment that indicates the determined emotional intensity.

17. The system of claim 15, wherein the error repair tool is further configured to insert into the source code a comment that indicates a number of occurrences of the error.

18. The system of claim 15, wherein the error repair tool is further configured to:
receive a second video of a second user describing a second error in the software application;
track a facial feature of the second user to determine a second emotional intensity;
convert an audio portion of the second video to a second text file;
analyze the second text file to determine the second error;
in response to the second emotional intensity exceeding the threshold:
determine, based on the plurality of previous software errors, a second series of steps that, when performed, replicate the second error;
determine, based on the series of steps and the plurality of solutions, that a ticket should be issued for the second error;
determine, based on steps taken in response to the ticket, a solution for the second error; and
add the solution for the second error to the plurality of solutions.

19. The system of claim 15, wherein the error repair tool is further configured to authenticate the user based on the video.

20. The system of claim 15, wherein the error repair tool is further configured to, after the change to the software code has been implemented, determine a second change to the software code for a second error that corresponds to a second emotional intensity that does not exceed the threshold.

* * * * *